Figure 1:
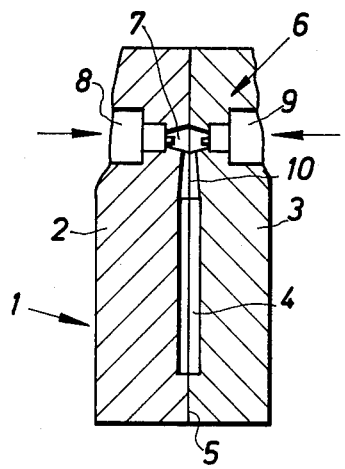

United States Patent
Boden et al.

[15] 3,709,640
[45] Jan. 9, 1973

[54] MEANS FOR THE PRODUCTION OF MOULDED COMPONENTS FROM CHEMICAL COMPONENTS WHCH REACT QUICKLY WITH ONE ANOTHER

[72] Inventors: Heinrich Boden, Opladen; Karl Breer, Cologne; Gunther Klessmann, Leverkusen; Ulrich Knipp, Schildgen-Nittum, all of Germany

[73] Assignee: Farbenfabriken Bayer Aktiengesellschaft, Leverkusen, Germany

[22] Filed: Sept. 15, 1970

[21] Appl. No.: 72,298

[30] Foreign Application Priority Data

Sept. 27, 1969 Germany..........P 19 48 999.7

[52] U.S. Cl. ............................425/4, 425/448, 259/4
[51] Int. Cl. ............................................B29d 27/04
[58] Field of Search......18/5 P, 30 WP, 30 NP, 30 K, 18/30 RM, 30 RC, 30 RH, 30 RP, 30 RV; 425/4, 448; 259/4

[56] References Cited

UNITED STATES PATENTS

| | | | |
|---|---|---|---|
| 3,551,947 | 1/1971 | Jennings | ...................18/5 P |
| 2,994,921 | 8/1961 | Hultgren | .............18/30 WP X |
| 3,278,658 | 10/1966 | Immel | .....................18/5 P X |

*Primary Examiner*—H. A. Kilby, Jr.
*Attorney*—Burgess, Dinklage & Sprung

[57] ABSTRACT

For better put out of moulded articles which are manufactured from chemical components reacting quickly with one another, a moulding tool is used which is immediately connected with the mixing chamber for the components, wherein the separation plane of the moulding tool passes through the mixing chamber and the sprue directly adjoints the mixing chamber.

7 Claims, 3 Drawing Figures

PATENTED JAN 9 1973 3,709,640

INVENTORS:
KARL BREER, ULRICH KNIPP, HEINRICH BODEN, GÜNTHER KLESSMANN.

BY Burgess, Dinklage
& Sprung,
ATTORNEYS

MEANS FOR THE PRODUCTION OF MOULDED COMPONENTS FROM CHEMICAL COMPONENTS WHCH REACT QUICKLY WITH ONE ANOTHER

The present invention is concerned with an apparatus for the manufacture of solid or foamed molded components from chemical components which react quickly with one another. It is particularly concerned with an apparatus in which materials based on polyurethanes, unsaturated polyesters, epoxide resins, ε-caprolactams and their copolymers may be reacted, a mixing chamber being connected to the interior of a molding tool.

With the molding tools that have been usual hitherto, the mixing head is mounted on a fitting of the mold box in order to fill the interior of the mold. Alternatively, the mixture is introduced through a supply pipe into the interior of the mold from the mixing head.

This arrangement has the disadvantage that, after completing the mixing operation, that is to say after filling the mold, the mixing chamber has to be flushed with a solvent or with compressed air. Such a procedure is costly, takes considerable time and does not ensure complete cleanliness of the mixing chamber. Moreover, unpleasant and undesired vapors are produced when using solvents, while, when blowing compressed air through the mixing head, the discharge of the fine particles of mixture atomized by the stream of compressed air is undesirable on account of harm caused to operating personnel.

The present invention has as its object to provide an arrangement which avoids the use of flushing agents.

This is achieved according to the invention by having the separation plane of the molding tool extending through the mixing chamber and by the sprue being directly connected to the outlet of the mixing chamber.

The effect thereby achieved is that the mixing head can be advantageously opened simultaneously with the opening of the molding tool, so that the mixing chamber is likewise exposed. On removing the molded element from the mold, the sprue rod which has simultaneously been formed in the sprue and also the foamed mixture which has remained in the mixing chamber can be removed from the mold. In this way, the residue which remains in the mixing chamber is deliberately caused to complete foaming in the chamber. This has the advantage that, with the extraction of the final foamed molding, usually no particles remain adhering to the walls, and any particles which do remain can be simultaneously removed in the same working step by cleaning the interior of the mold by means of a jet of compressed air. It is true that this involves a loss of material, but this is insignificant by comparison with the size of the molded element and by comparison with the time which would be incurred for flushing the mixing head with a flushing agent.

Because the mixing chamber is arranged in the immediate vicinity of the sprue, the sprue can be so shaped that it increases in size towards the internal chamber of the mold. The sprue can be made conical or trumpet-shaped and can be employed generally for molding tools. The purpose of the widening of the sprue is that a sudden change in pressure at the time of injecting the mixture into the mold, such as occurs with a cylindrical sprue, is avoided. This sudden expansion of the foamable mixture causes the discharge of the gas dissolved in the mixture and leads to casting defects, for example blow-holes or other fine-pore surface defects. It is possible empirically to establish on the basis of tests what degree of widening of the sprue is desirable, depending on the actual mixture involved. Consequently, the sprue is advantageously designed as an exchangeable fitting.

In another particular embodiment, the invention provides for the sprue to have a deflection and for a collecting pocket to be arranged on the outside of the deflection. This has the particular advantage that the first part of the mixture is collected in the collecting pocket and consequently does not pass into the interior of the mold, but is removed together with the sprue rod as waste on emptying the mold. The first part of the mixture usually does not represent a foamable mixture because the components have not been completely mixed owing to one of the components being introduced first on opening the inlet nozzles. The collecting pocket can, however, be used independently of the main feature of the invention.

In one particularly useful form of the invention, the mixing chamber is arranged directly in the molding tool. The only essential thing is that the mixing chamber must be intersected by the separation plane of the mold or the separation plane must be at a tangent to the mixing chamber, and in fact in such a way that each of the two molding tool parts forms a portion of the wall of the mixing chamber. It is only in this case that the mixing chamber is also open on opening the molding tool. It is immaterial in this respect whether the separation plane of the molding tool lies in the same geometrical plane as the separation plane of the sprue or of the mixing chamber. This means, therefore, that the expression "separation plane" is here to be understood as meaning the separation of the molding tool, the sprue and the mixing chamber into two parts, regardless of whether parts of this separation plane are staggered with respect to one another. By way of example, it is possible for that part of the separation plane affecting the interior of the mold to be arranged horizontally, while the part of the separation plane of the sprue and of the mixing chamber extend obliquely or perpendicularly thereto. The only limitation imposed on the disposition of the separation plane is that the molding tool must be able to be opened and the molded material to be removed.

In an alternative embodiment, the mixing chamber is arranged directly in the molding tool, and the mixing chamber consists of a mixing head which is adapted to be mounted in a manner known per se on a fitting of the molding tool, and consists according to the invention of two housing components which can be connected to one another. In this case, the mixing head and molding tool can be separated from one another. The molding tool and mixing head are thus capable of being separately opened and closed. The connection of the parts of the housing of the mixing head is advantageously effected by a quick-closure device as known per se, for example by a tensioning screw or a tensioning band.

Figure 2:
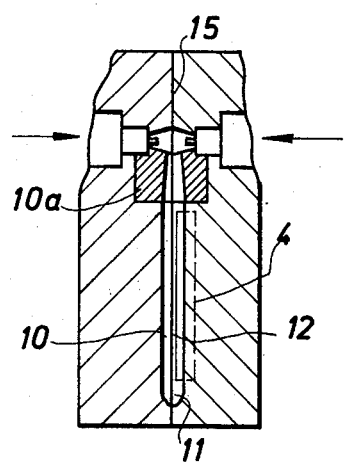
Figure 3:
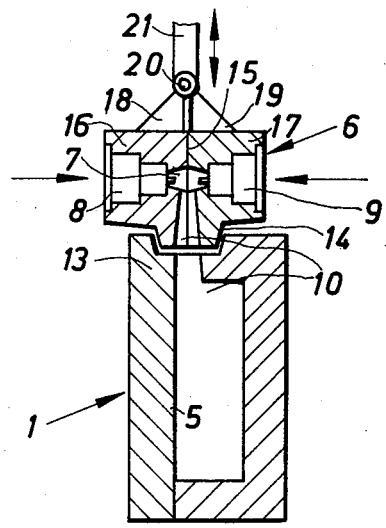

Several embodiments of the apparatus according to the invention are shown in section in a drawing, wherein:

FIG. 1 shows the arrangement with a mixing head arranged in a molding tool,

FIG. 2 shows the arrangement of FIG. 1 modified by the use of a so-called film channel and a collecting pocket, and FIG. 3 shows a mixing head consisting of two closable housing parts and adapted to be fitted on to the mixing chamber. In FIG. 1, a molding tool 1 comprises mold box sections 2 and 3 which enclose an internal chamber 4 of the mold. The separation plane between the two mold box sections is indicated at 5. A mixing head 6 is moved into the molding tool 1 in such a way that a mixing chamber 7 is intersected by the mold separation plane. An inlet nozzle 8 is arranged in the mold box section 2, while an inlet nozzle 9 for a second component is provided in the mold box section 3. A sprue 10 extends directly from the mixing chamber 7 to the internal chamber 4 of the mold. This sprue 10 widens out conically in order to avoid the emergence of gas dissolved in the mixture.

In FIG. 2, a collecting pocket 11 is disposed alongside the sprue 10 longitudinally thereof. The pocket collects the first incompletely mixed portion of the liquid mixture. The conical part of the sprue 10 is constructed as a replaceable, two-part fitting 10a. The main portion of the foamable mixture reaches the interior 4 of the mold through the sprue 12. With this embodiment, the sprue 10 directly adjoins the mixing chamber 7.

In FIG. 3, the molding tool 1 is provided with a fitting 13 which is shaped to complement a coacting part 14 of the mixing head 6. The separation plane of the mold is indicated at 5 and it is offset with respect to the separation plane 15 of the mixing head. The sprue is disposed partly in the molding tool 1 and partly in the mixing head 6. The mixing head 6 itself consists of two housing sections 16 and 17, which are pressed one against the other in the closed position and thus close off the mixing chamber 7 from the exterior. The inlet nozzles for the components are indicated at 8 and 9. The two housing sections 16 and 17 are adapted to pivot on supporting arms 18 and 19 about a common shaft 20. This shaft is fixed on a sliding rod 21 by means of which the mixing head 6 can be moved towards or away from the molding tool 1.

We claim:

1. An apparatus for manufacture of solid or foamed articles from chemical components which react quickly with one another, such as components for the production of polyurethane, comprising:

a. a mould formed by a wall defining a mould cavity,
b. a stirrerless mixing chamber in the wall of the mould for mixing together of the components,
c. a sprue passageway in the wall communicating the mixing chamber and mould cavity for delivery of the mixed components from the mixing chamber to the mould cavity,
d. at least two inlet nozzles for introduction of the components into the mixing chamber for mixing thereof,
e. said mould wall being formed by two separable parts defined by a separation plane extending through the mixing chamber and the sprue passageway, whereby following filling of the mould and reaction of the components forming the article, the mould parts can be separated along the separation plane, permitting removal of the article, sprue, and material remaining in the mixing chamber.

2. Apparatus according to claim 1, said inlet nozzles being mounted in the wall of the mould.

3. Apparatus according to claim 2, wherein the sprue passageway diverges toward the mould cavity.

4. Apparatus according to claim 3, wherein a removable insert in the mould wall defines the diverging portion of the sprue passageway.

5. Apparatus according to claim 1, the sprue passageway including a turning portion for deflection of the components in the sprue passageway, a collecting pocket communicating with the turning portion for receiving and entraping the first portion of the mixture of components passing through the sprue passageway.

6. Apparatus according to claim 2, the sprue passageway including a turning portion for deflection of the components in the sprue passageway, a collecting pocket communicating with the turning portion for receiving and entraping the first portion of the mixture of components passing through the sprue passageway.

7. Apparatus according to claim 3, the sprue passageway including a turning portion for deflection of the components in the sprue passageway, a collecting pocket communicating with the turning portion for receiving and entraping the first portion of the mixture of components passing through the sprue passageway.

* * * * *

UNITED STATES PATENT OFFICE
CERTIFICATE OF CORRECTION

Patent No. 3,709,640      Dated January 9, 1973

Inventor(s) Heinrich Boden, Karl Breer, Gunther Klessmann, and Ulrich Knipp

It is certified that error appears in the above-identified patent and that said Letters Patent are hereby corrected as shown below:

1. Col. 4, line 41, (claim 7, line 1), change "claim 3" to --claim 4--.

Signed and sealed this 20th day of November 1973.

(SEAL)
Attest:

EDWARD M. FLETCHER, JR.
Attesting Officer

RENE D. TEGTMEYER
Acting Commissioner of Patents